United States Patent [19]

Sakai et al.

[11] 4,269,894

[45] May 26, 1981

[54] ELECTRIC WINDINGS AND PRODUCTION THEREOF CHARACTERIZED BY THE USE OF A CONDENSATION TYPE SILICON RESIN FOR COMBINATION WITH AN ADDITION TYPE SILICON RESIN

[75] Inventors: Masahiko Sakai, Hitachi; Shinichi Toyoda, Katsuta; Toshikazu Narahara, Tokaimura; Takeshi Hakamada; Tomoya Tsunoda, both of Hitachi, all of Japan

[73] Assignee: Hitachi, Ltd., Tokyo, Japan

[21] Appl. No.: 99,850

[22] Filed: Dec. 3, 1979

[51] Int. Cl.$^3$ .................. H01B 3/40; H01B 3/46; H01B 13/08; H01B 17/62

[52] U.S. Cl. .................. 428/377; 156/53; 156/56; 156/329; 156/330; 174/110 E; 174/110 SR; 174/110 S; 174/120 SR; 174/120 C; 174/122 G; 174/124 GC; 427/104; 427/116; 427/117; 427/118; 427/386

[58] Field of Search ............... 156/53, 56, 329, 330; 174/110 E, 120 SR, 121 SR, 110 SR, 110 S, 120 C, 122 G, 124 GC; 427/104, 116, 117, 386, 118; 428/377

[56] References Cited

U.S. PATENT DOCUMENTS 4,222,802  9/1980  Sakai et al. .................. 156/53

Primary Examiner—James C. Cannon
Attorney, Agent, or Firm—Craig and Antonelli

[57] ABSTRACT

Electric windings comprising an electric conductor and a plurality of cured insulating layers wrapping around the conductor, said cured insulating layers being obtained by bonding two or more insulating materials with a binder solution containing a mixture of a condensation polymerization type silicone resin containing hydroxyl groups in the molecule and an addition polymerization type silicone resin to form a composite insulating material, wrapping the composite insulating material around the conductor, impregnating the wrapped composite insulating material with an impregnating varnish of an epoxy-isocyanate resin and curing the impregnated composite insulating material, have excellent water resistance in addition to excellent thermal resistance, and mechanical properties.

17 Claims, 1 Drawing Figure

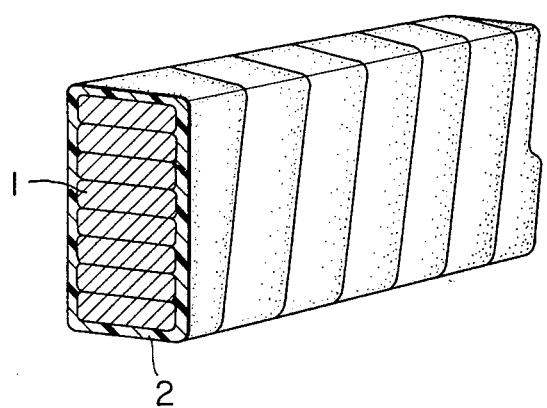

ELECTRIC WINDINGS AND PRODUCTION THEREOF CHARACTERIZED BY THE USE OF A CONDENSATION TYPE SILICON RESIN FOR COMBINATION WITH AN ADDITION TYPE SILICON RESIN

This invention relates to electric machine windings having thermal resistance of class H or more and being excellent in electrical properties, mechanical properties and water resistance and a process for producing the same.

Recently, electric windings having excellent properties in thermal resistance, electrical properties, mechanical properties, water resistance, and the like have strongly been desired with the enlargement of capacity or miniaturization and weight saving of electric rotary machines and the like, or with the use of electric machines under severe conditions. In order to meet such demands, there was proposed a process for producing electric windings having thermal resistance in the range of class H to class C by forming an insulating wrapping layer from glass backed mica tape bonded by a silicone binder, impregnating the insulating wrapping layer with a solventless silicone resin varnish and curing it, but the resulting electric windings were insufficient in thermal resistance and water resistance.

In order to improve such defects as mentioned above, the present inventors have proposed a process for producing electric windings by forming a composite insulating material by using a condensation polymerization type silicone resin having hydroxyl groups in the molecule as a binder, impregnating the composite insulating material with an epoxy-isocyanate series resin and curing it into one piece (U.S. Patent Application Ser. No. 38,424). The condensation polymerization type silicone resin remarkably well bonds individual insulating materials by the action of the hydroxyl group and is excellent as a binder. Further, since it has siloxane bonds in the backbone chain of silicone resin, it is good in thermal resistance and since it has remarkably great gas permeability comparing with other organic materials, it can release a gas out of the insulating layer even if the gas is generated due to thermal deterioration, which results in hardly bringing about delamination of insulating layers due to storage of the gas. A further advantage of the condensation polymerization type silicone resin is in that the hydroxyl groups of the silicone resin easily react with the isocyanate in the impregnating varnish of epoxyisocyanate series resin to give a strongly bonded insulating layer from the impregnating varnish and the insulating material. But recently, it was found that the thus produced electric windings were still insufficient in water resistance from the viewpoint of practical use. This reason is not clear but it seems possible that heated unreacted hydroxyl groups bring about dehydration, dealcoholization, and dehydrogenation, which results in delamination of insulating layers and causing cracks.

In order to improve the water resistance, the combined use of a coupling agent and a surface active agent was examined but no sufficient result was obtained.

It is an object of this invention to provide electric windings having thermal resistance of class H (180° C.) or more and excellent water resistance. It is another object of this invention to provide a process for producing such electric windings.

This invention provides a winding for electric rotating machines having a plurality of layers of a sheet-form composite insulating material wrapped around a conductor and a cured resin impregnated into said layers, said cured resin being of an epoxy-isocyanate varnish, said sheet-form composite insulating material comprising two or more sheet-form insulating materials bonded by a binder, characterized in that said binder is a mixture of a condensation polymerization type silicone resin containing hydroxyl groups in the molecule and an additoin polymerization type silicone resin.

This invention also provides a process for producing an electric winding comprising wrapping around a conductor a plurality of layers of a sheet-form composite insulating material comprising two or more sheet-form insulating materials bonded by a binder, impregnating the layers with an impregnating varnish of an epoxy-isocyanate resin and curing the resulting impregnated varnish, the improvement wherein said binder is a mixture of a condensation polymerization type silicone resin containing hydroxyl groups in the molecule and an addition polymerization type silicone resin.

The attached drawing is a fragmentary view in perspective, showing part of an electric winding of this invention.

As to the addition polymerization type silicone resin used in this invention, since it is cured by addition polymerization reaction of unsaturated groups such as vinyl groups, allyl groups, etc. with SiH groups, there is produced no by-product such as water at the time of curing. Further, since the addition polymerization type silicone resin has a lower crosslinking density than the condensation polymerization type silicone resin having hydroxyl groups, the former has larger gas permeability than the latter. But, on the other hand, the addition polymerization type silicone resin is inferior in bonding strength for adhering individual insulating materials. This is unfavorable from the viewpoint of wrapping workability. Further, there arises a problem of delamination of insulating layers due to insufficient bonding strength after impregnation and curing of an epoxy-isocyanate series varnish. In addition, the addition polymerization type silicone resin is easily deteriorated by heat due to the vinyl groups in the molecule comparing with the condensation polymerization type silicone resin. This can be identified by weight loss by heating.

The present inventors have extensively studied to overcome the defects of the addition polymerization type and condensation polymerization type silicone resins and surprisingly found that the combined used of the addition polymerization type silicone resin and the condensation polymerization type silicone resin as a binder can remove the defects mentioned above and accomplished this invention.

The mixing ratio of the condensation polymerization type silicone resin and the addition polymerization type silicone resin in the binder can be selected depending on the utility of the winding to be applied, but is preferably in the range of 50 to 95% by weight of the former and 50 to 5% by weight of the latter. When the amount of the addition polymerization type silicone resin is as low as less than 5% by weight, improvement in water resistance becomes small. On the other hand, when the amount of it is larger than 50% by weight, there is a tendency of lowering thermal resistance and mechanical strength, which results in easily bringing about delamination of the composite insulating layers.

A coating amount of the mixed binder on the composite insulating material is not particularly limited but taking workability, impregnating rate and properties of electric windings into consideration, it is desirable to use 1 to 40% by weight, more preferably 5 to 35% by weight of the binder based on the total weight of the composite insulating material and the binder. More concretely, in the case of the combination of glass tape and mica tape as the composite insulating material, the use of 15 to 30% by weight of the binder, and in the case of the combination of a polyimide film and mica tape, the use of 10 to 25% by weight of the binder are most effective.

The mixed binder of the addition polymerization type silicone resin and the condensation polymerization type silicone resin may further contain a conventional silane series coupling agent such as aminosilane, epoxysilane, etc. By adding such a silane coupling agent to the mixed binder, water resistance of the electric winding is improved and in addition mechanical strength of the tape itself is also improved.

As the condensation polymerization type silicone resin containing hydroxyl groups, there can be used that obtained by conventional processes, e.g. by formulating silanes represented by the formulae, $RSiX_3$, $R_2SiX_2$ and $R_3SiX$, wherein R is hydrogen, an alkyl group such as methyl, ethyl, etc., an aromatic group, such as phenyl, tolyl, etc., and X is halogen or a group which can be hydrolyzed such as alkoxy, in a desired composition depending on objects, hydrolyzing the resulting composition with additoin of water, carrying out partial dehydration condensation of the hydroxyl groups bonded to silicon atoms in the presence of heat or a catalyst, and increasing degree of polymerization to a proper value.

These silicone resins containing hydroxyl groups are available commercially. For example, there can preferably be used silicone resins KR-275 (hydroxyl group content 0.5–1% by weight), KR-272 (hydroxyl group content 2% by weight), KR-214 (hydroxyl group content 4% by weight) and KR-216 (hydroxyl group content 6% by weight), all of them being manufactured by Shin-etsu Silicone Co., Ltd., and SH 994 (hydroxyl group content 0.2–1% by weight manufactured by Toray Silicone K.K.) together with amine compound catalysts such as triethanolamine, etc. or organometallic salt catalysts such as zinc octoate, etc. It is preferable to use the silicone resin containing hydroxyl groups in an amount of 0.2–6% by weight and more preferably 0.2–1% by weight. The silicone resins can be used along or as a mixture of two or more of them. Too high hydroxyl group content makes the silicone resins solid at room temperature, so that too high hydroxyl group content is not preferable from the viewpoint of workability.

As the additoin polymerization type silicone resin, there can be used the following conventional ones:

(1) those applying polymerization of individual vinyl groups, and (2) those applying addition polymerization of vinyl groups and hydrogen atoms. Organopolysiloxanes containing vinyl groups used in the above cases (1) and (2) can be prepared by conventional processes. For example, a mixture of two or more of organochlorosilanes such as dimethyldichlorosilane, diethyldichlorosilane, methylethyldichlorosilane, methylpropyldichlorosilane, methylbutyldichlorosilane, dipropyldichlorosilane, methylphenyldichlorosilane, ethylphenyldichlorosilane, diethylphenylchlorosliane, diphenyldichlorosilane, methyltrichlorosilane, ethyltrichlorosilane, propyltrichlorosilane, butyltrichlorosilane, phenyltrichlorosilane, and the like and organochlorosilanes containing vinyl groups such as vinyltrichlorosilane, methylvinyldichlorosilane, phenylvinyldichlorosilane, ethylvinyldichlorosilane, and the like is subjected to co-hydrolysis, deacidification and dehydration condensation reactoins to give organopolysiloxanes containing vinyl groups easily.

Organopolysiloxanes containing hydrogen atoms necessary in the above case (2) can easily be prepared via hydrolysis, deacidification and dehydration condensation reactions as mentioned above from organochlorosilanes containing SiH groups such as methylhydrogendichlorosilane, ethylhydrogendichlorosilane, phenylhydrogendichlorosilane, propylhydrogendichlorosilane, butylhydrogendichlorosilane, and the like.

The thus prepared organopolysiloxanes containing vinyl groups and organopolysiloxanes containing hydrogen atoms are mixed with conventional catalysts such as peroxides or platinum to give cured addition polymerization type silicone resins. But in such cases, there is a tendency to give hard and brittle cured materials, which lowers their practical utility values. In order to improve such a defect, for example, other kinds of organochlorosilanes such as monophenyltrichlorosilane, diphenyldichlorosilane, dimethyldichlorosilane, trimethylchlorosilane, and the like may be added to the above-mentioned organochlorosilanes at the time of hydrolysis to give copolymers via co-hydrolysis, deacidification and dehydration condensation reactions.

In order to impart desired properties to the thus prepared copolymers when cured, it is necessary to add a catalyst thereto. The catalyst may be selected from conventional peroxides such as dicumyl peroxide, benzoyl peroxide, di-tertiary-butyl peroxide, etc. or rhodium or platinum series catalysts and the like. These catalysts may be used alone or as a mixture of two or more of them. The amount of the catalyst is, in the case of the peroxides, preferably 0.1 to 5.0% by weight based on the total weight of the organopolysiloxanes and in the case of rhodium and platinum series catalysts, preferably 0.1 to 100 ppm based on the total weight of the organopolysiloxanes.

As the insulating materials for producing the composite insulating material, there can be used organic and inorganic insulating materials. Preferable examples of the organic insulating materials are films containing at least one structural unit selected from aromatic polyamides, polyimides, polybenzoimidazoles, polyamideimides, polyester-imides, polysulfones, poly-p-xylylenes, poly(phenylene oxide), poly(imidazopyrrolone ether), polyimidazopyrrolone, poly(p-phenylene oxadiazole), polybenzothiazole, polytriazole, polyquinazolinedione, polybenzoxazinone, polyoxazolone, polyoxacyanine, polybenzoimidazole-imide, polyindophenazine, polybenzoxazolepyromellitimide, polyisoindroquinazolinedione, polymethylquinazoline, polybenzoimidazoquinazoline, polyindolone, polyimidazobenzophenanthroline, etc., nonwoven fabrics, paper, and the like, taking thermal resistance into consideration. Examples of inorganic insulating materials are glass cloth, mica sheet, and the like. As the mica sheet, that obtained in the form of sheet from soft or hard mica without calcination or with calcination can preferably be used.

The composite insulating material used in this invention means that obtained by bonding two or more insulating materials mentioned above with the binder mentioned above. The combination of two or more insulating materials may be the combination of the same kind of two or more insulating materials or the combination of different kinds of two or more insulating materials. Examples of composite insulating materials are glass tape-backed mica sheet, polyimide film or polyamideimide film-backed mica sheet, etc.

As the polyimide which contains imide rings in the molecular structure, there can be used a reaction product of a tetracarboxylic acid anhydride and a diamine, a reaction product of a tetracarboxylic acid anhydride and a diisocyanate, a reaction product of bisphthalimide or bismaleimide and a diamine, a reaction product of bisphthalimide or bismaleimide and a vinyl compound, and the like. As the polyamideimide, there can be used a reaction product obtained by reacting a reaction product of an excess primary diamine and a dicarboxylic acid chloride, with a tetracarboxylic acid anhydride, a reaction product obtained by reacting a reaction product of a tetracarboxylic acid anhydride and an excess diamine, with a dicarboxylic acid chloride, a reaction product of a primary diamine and trimellitic acid anhydride, and the like. There can also be used polyesterimide compounds which can be obtained from a reaction product of trimellitic acid anhydride with a diol as a precursor using the same procedure as mentioned in the case of obtaining the polyamideimide compounds. Among these polymers containing imide rings, from the viewpoints of availability, workability and physical and chemical properties, etc., Kapton (a polyimide film manufactured by E. I. du Pont de Nemours & Co.), Pifron II (a polyamideimide film manufactured by Hitachi Chemical Co., Ltd.) and the like can preferably be used. The composite insulating material is wrapped around an electrical conductor using a conventional method.

Subsequently, the wrapped composite insulating material is impregnated with an epoxy-isocyanate series resin varnish comprising a polyfunctional epoxy compound and a polyfunctional isocyanate compound with special proportions as disclosed in U.S. Pat. No. 4,070,416.

As the polyfunctional epoxy compound used in the present invention, there can be used bifunctional epoxides such as, for example, diglycidyl ether of bisphenol A, butadiene diepoxide, 3,4-epoxycyclohexylmethyl-(3,4-epoxy)-cyclohexane carboxylate, vinylcyclohexene dioxide, 4,4′-di(1,2-epoxyethyl)diphenylether, 4,4′-di(1,2-epoxyethyl)biphenyl, 2,2-bis(3,4-epoxycyclohexyl)propane, diglycidyl ether of resorcinol, diglycidyl ether of phloroglucinol, diglycidyl ether of methylphloroglucinol, bis(2,3-epoxycyclopentyl)ether, 2-(3,4-epoxy)cyclohexane-5,5-spiro(3,4-epoxy)-cyclohexane-m-dioxane, bis(3,4-epoxy-6-methylcyclohexyl)adipate, N,N′-m-phenylenebis(4,5-epoxy-1,2-cyclohexanedicarboxyimide) and the like; and tri- or more functional epoxy compounds such as triglycidyl ether of p-aminophenol, polyallylglycidyl ether, 1,3,5-tri(1,2-epoxyethyl)-benzene, 2,2′,4,4′-tetraglycidoxybenzophenone, tetraglycidoxytetraphenylethane, polyglycidyl ether of phenol-formaldehyde novolac, polyglycidyl ether of cresol-formaldehyde novolac, triglycidyl ether of glycerol, triglycidyl ether of trimethylolpropane and the like. With respect to the other epoxy compounds, a book entitled "Epoxy Resins" (American Chemical Society, 1970) written by Henry Lee and a book entitled "Handbook of Epoxy Resin" (McGraw Hill Book Co., 1967) written by Henry Lee and K. Neville contain the descriptions of the resins.

Among the aforesaid polyfunctional epoxies, diglycidyl ether of bisphenol A and the polyglycidyl ether of phenol-formaldehyde novolac have particular good reactivity. Therefore, they are useful compounds. Further, halides of these compounds can be used, too.

As the polyfunctional isocyanate compounds, there can be used bifunctional isocyanates, such as, for example, methane diisocyanate, butane-1,1-diisocyanate, ethane-1,2-diisocyanate, butane-1,2-diisocyanate, trans-vinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω,ω′-1,3-dimethylbenzene diisocyanate, ω,ω′-1,4-dimethylbenzene diisocyanate, ω,ω′-1,3-dimethylcyclohexane diisocyanate, ω,ω′-1,4-dimethylcyclohexane diisocyanate, ω,ω′-1,4-dimethylbenzene diisocyanate, ω,ω′-1,4-dimethylnaphthalene diisocyante, ω,ω′-1,5-dimethylnaphthalene diisocyanate, cyclohexane-1,3-diisocyanate, cyclohexane-1,4-diisocyanate, dicyclohexylmethane-4,4′-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4′-diisocyanate, diphenylether-2,4-diisocyanate, naphthalene-1,4-diisocyanate, naphthalene-1,5-diisocyanate, biphenyl-4,4′-diisocyanate, 3,3′-dimethylbiphenyl-4,4′-diisocyanate, 2,3′-dimethoxybiphenyl-4,4′-diisocyanate, diphenylmethane-4,4′-diisocyanate, 3,3′-dimethoxydiphenylmethane-4,4′-diisocyante, 4,4′-dimethoxydiphenylmethane-3,3′-diisocyanate, diphenylsulfide-4,4′-diisocyanate, diphenylsulfone-4,4′-diisocyanate and the like; and trifunctional or more isocyanates, such as, for example, polymethylenepolyphenylisocyanate, triphenylmethanetriisocyanate, tris(4-isocyanatephenyl)-thiophosphate), 3,3′,4,4′-diphenylmethanetetraisocyanate and the like.

Further, dimers and trimers of the foregoing polyisocyanates are useful. The dimers and trimers are terminated by free isocyanate groups and contain one or more isocyanurate rings or uretdione rings, or both. Methods of preparing various kinds of trimers and uretdiones are disclosed in U.S. Pat. Nos. 3,494,888; 3,108,100; and 2,977,370, etc.

The proportions of the epoxy compound and the isocyanate compound in the insulating varnish should be within limited ranges in order to impart excellent thermal resistance to the cured article. Said proportions are 1.5 equivalents or more of the isocyanate compound per equivalent of the epoxy compound. If the proportion of the isocyanate compound is less than 1.5 equivalents, sufficient thermal resistance cannot be obtained. More preferable range is 2.5–25 equivalents of the isocyanate compound per equivalent of the epoxy compound. If the proportion of the isocyanate compound is more than 25 equivalents, the resulting cured article has no good balance in weight loss by heating, electrical properties, mechanical properties, etc., which may result in lowering in insulation properties of the electric winding.

In order to accelerate curing of the epoxy-isocyanate series resin varnish, it is necessary to use a catalyst. As these catalysts, organic compounds having at least one atom selected from the elements belonging to the group Va in the periodic table in the molecule are useful.

Examples of suitable catalysts are tertiary amines such as trimethylamine, triethylamine, tetramethylbutanediamine, tetramethylpentanediamine, tetramethylhexanediamine, triethylenediamine, N,N-dimethylaniline, etc.; oxyalkylamines such as dimethylaminoethanol, dimethylaminopentanol, etc.; amines such as tris(dimethylaminomethyl)phenol, N-methylmorpholine, N-ethylmorpholine, etc.; quaternary ammonium salts such as cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allyldodecyltrimethylammonium bromide, benzyldimethylstearylammonium bromide, benzyldimethyltetradecylammonium acetate, etc.; imidazoles such as 2-dimethylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-triazinyl-2-ethyl)-2-ethylimidazole, 1-(4,6-diamino-s-triazinyl-2-ethyl)-2-phenylimidazole, 1-(4,6-diamino-s-triazinyl-2-ethyl)-2-isopropylimidazole, 2-phenylimidazole, 1-(4,6-diamino-s-triazinyl-2-ethyl)-2-ethylimidazole, 1-(4,6-diamino-s-triazinyl-2-ethyl)-2-methylimidazole, 1-(4,6-diamino-s-triazinyl-2-ethyl)-2-undecylimidazole, etc.; tetra-substituted borate type compounds of phosphorus, arsenic, antimony and bismuth such as

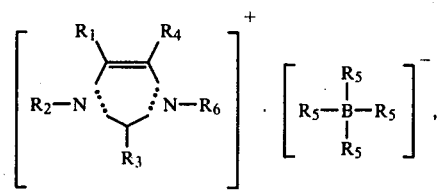

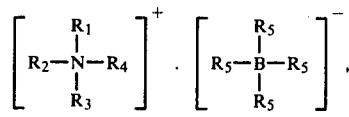

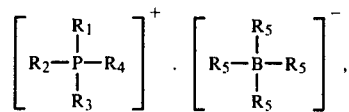

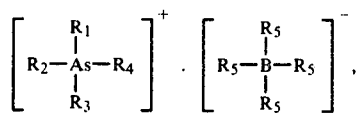

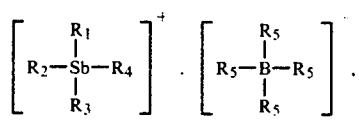

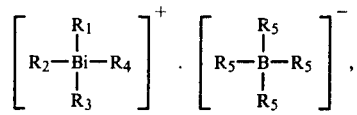

wherein $R_1$, $R_2$, $R_3$, $R_4$ and $R_6$ are independently hydrogen, an alkyl group having 1 to 5 carbon atoms, an alkenyl group having 2 to 6 carbon atoms, a phenyl group, or a substituted phenyl group such as a $C_{1-4}$ alkylsubstituted phenyl group, a $C_{1-4}$ alkoxy-substituted phenyl group, and $R_5$ is a phenyl group, or a substituted phenyl group such as a $C_{1-4}$-alkyl-substituted phenyl group, a $C_{1-4}$ alkoxy-substituted phenyl group.

Among them, those having nitrogen oxide or phosphorus are particularly useful from the viewpoints of availability and workability.

These catalysts are preferably used in an amount of 0.01 to 10% by weight based on the weight of the insulating epoxy-isocyanate series resin varnish. If the amount of the catalyst is outside the above-mentioned range, the resulting cured article shows a tendency to become brittle or to generate a gas due to thermal degradation much more.

In some cases, the catalyst for the insulating varnish may be mixed with the silicone resin mixed binder and added to the insulating materials prior to the impregnation with the insulating varnish.

The epoxy-isocyanate series resin varnish may preferably contain a plymerization inhibitor in order to prolong a pot life thereof. Such a polymerization inhibitor is illustrated in, e.g., U.S. Pat. No. 4,129,554.

This invention is illustrated in more detail by way of the following Examples in which all parts and percents are by weight unless otherwise specified.

EXAMPLES 1-3

(1) Preparation of a composite insulating material

A binder solution was prepared by mixing 95% (as nonvolatile content) of a condensation polymerization type silicone resin containing hydroxyl groups (hydroxyl group content 1%; a 50% solution of KR-272 manufactured by Shin-etsu Silicone Co., Ltd.) and 5% (as nonvolatile content) of an addition polymerization type silicone resin A (a copolymer of 40% by mole of monophenylsiloxane unit, 15% by mole of vinylmethylsiloxane unit and 45% by mole of dimethylsiloxane unit, containing 1.5% of dicumyl peroxide based on the weight of the copolymer) and diluting the mixture with toluene so as to make the nonvolatile content 50%.

Using the thus prepared binder solution, uncalcined soft assembly mica sheet and glass cloth were bonded and the solvent was removed by evaporation. Thus, three kinds of glass-backed assembly mica tape (composite insulating materials) containing binder in an amount of 5, 20 and 35% as nonvolatile content based on the total weight of the composite insulating material were prepared. The resulting insulating materials were cut to give composite tapes of 25 mm wide.

(2) Preparation of an impregnating varnish

An impregnating varnish of epoxy-isocyanate series resin was prepared by mixing 100 parts of diglycidyl ether of bisphenol A (DER-332 manufactured by Dow Chemical Co., epoxy equivalent 175), 400 parts of liquid diphenylmethane diisocyanate (Desmodur CD manufactured by Bayer A. G., isocyanate equivalent 140) (hereinafter referred to as "L-MDI") and 3.0 parts of 2-ethyl-4-methylimidazole.

(3) Production of electric winding

The composite insulating material prepared in the above-mentioned (1) was wrapped around a bare electric conductor. The resulting winding was varuum impregnated under pressure with the impregnating varnish prepared in the above-mentioend (2) and then cured at 100°–150° C. for 20 hours and at 200°–220° C. for 4 hours with heating.

Water resistance and thermal resistance of the resulting windings were tested in the following manners. The attached drawing is a fragmentary view in perspective, showing part of an electric winding used for the tests, wherein the conductor 1 is wrapped with the insulating layer 2 which has been impregnated with the varnish and cured to be made one piece.

(a) Thermal resistance test

An electric winding was heated at 270° C. for 24 hours and subsequently was placed under the conditions of a temperature of 40° C. and a relative humidity of 95% for 24 hours. This procedure was defined as one cycle and repeated for 10 times. Each end of each cycle, dielectric loss tangent (tan δ) and insualtion resistance were measured. The results are as shown in Table 1.

(b) Short time thermal resistance test

A specimen of 50×50 mm was cut out of the insulating layer of the electric winding mentioned above and heated at 270° C. for 10 days to measure a weight loss due to thermal deterioration. The results are as shown in Table 1.

(c) Water resistance test

A specimen of 10 mm wide and 60 mm long was cut out of the insulating layer of the electric winding mentioned above along the direction of wrapping of the tape. The specimen was supported by two points at a distance of 40 mm between the two points with loading at the center to measure flexural strength at 25° C. After immersing the specimen in water at 40° C. for 24 hours, flexural strength of the thus treated specimen was measured in the same manner as mentioned above. The results are as shown in Table 1.

EXAMPLES 4–6

A binder solution was prepared in the same manner as described in Example 1 except for changing the mixing ratio of a condensation polymerization type silicone resin containing hydroxyl groups to an addition polymerization type silicone resin to 90%: 10%, 80%: 20% or 50% 50%. Using the thus prepared binder solution, uncalcined soft assembly mica sheet and glass cloth were bonded so that the coating amount of the binder became 20% as nonvolatile content (based on the total weight). The sheet was cut to give a glass-backed mica tape of 25 mm wide.

Using the glass-backed mica tape, an electric winding was produced in the same manner as described in Example 1 and its thermal resistance, short time thermal resistance and water resistance were tested in the same manner as described in Example 1. The results are as shown in Table 1.

EXAMPLES 7–9

To 100 parts of a 50% solution of a condensation polymerization type silicone resin containing hydroxyl group (KR-275 manufactured by Shin-etsu Silicone Co., Ltd.), 5 parts of an amine curing catalyst (D-275 manufactured by Shin-etsu Silicone Co., Ltd.) was added. To the resulting mixture, the same addition polymerization type silicone resin as used in Example 1 was added so that the mixing ratio of the condensation polymerization type to the addition polymerization type became 80% to 20%. The resulting mixture was diluted with toluene to give a binder solution having 50% of total nonvolatile content.

Using the thus prepared binder solution, glass-backed mica tape was prepared in the same manner as described in Examples 1–3 and an electric winding was produced in the same manner as described in Example 1. Thermal resistance, short time thermal resistance and water resistance were tested in the same manner as described in Example 1. The results are as shown in Table 1.

EXAMPLE 10

To the same binder composition as used in Example 8, 2-ethyl-4-methylimidazole (manufactured by Shikoku Kasei Co., Ltd., hereinafter referred to as "2E4MZ"), which is a curing catalyst for the epoxyisocyanate series resin impregnating varnish, was added and glass-backed mica tape was prepared in the same manner as described in Example 8. The catalyst content was 3 g per m$^2$ of the tape area.

The thus prepared tape was wrapped around an electric conductor to form an insulating layer, which was vacuum impregnated under pressure with the same impregnating varnish as used in Example 1 except that the varnish did not contain a curing catalyst and an electric winding was produced in the same manner as described in Example 1. Thermal resistance, short time thermal resistance and water resistance were tested in the same manner as described in Example 1. The results are as shown in Table 1.

EXAMPLE 11

To the same silicone resin binder as used in Example 8, a silane coupling agent, γ-aminopropyltriethoxysilane (NH$_2$CH$_2$CH$_2$CH$_2$Si(OC$_2$H$_5$)$_3$) (A-1100 manufactured by Union Carbide Corp.) was added in an amount of 0.5 g per m$^2$ of glass-backed mica tape to be prepared. Using the thus prepared binder solution containing the silane coupling agent, glass-backed mica tape was prepared (the silicone resin binder content as non-volatile content in the tape, 20%) and an electric winding was produced in the same manner as described in Example 1. Thermal resistance, short time thermal resistance and water resistance were tested in the same manner as described in Example 1. The results are as shown in Table 1.

EXAMPLES 12 AND 13

Binder solutions were prepared by mixing 90% and 80% (as nonvolatile content) of silicone resin containing hydroxyl groups (a 50% solution of SH 994 manufactured by Toray Silicone K.K., hydroxyl group content of SH 994 0.2–1%) with 10% and 20% (as nonvolatile content) of the same addition polymerization type silicone resin as used in Example 1.

Using these binder solutions, glass-backed mica tape wherein the binder content in the tape as nonvolatile content was 20% based on the total weight was prepared. Electric windings were produced by using these glass-backed mica tape and tested in the same manner as described in Example 1. The results of thermal resistance, short time thermal resistance and water resistance are as shown in Table 1.

EXAMPLES 14–16

A binder solution was prepared by mixing 80% (as nonvolatile content) of a condensation polymerization type silicone resin containing hydroxyl groups (KR-275) together with an amine curing catalyst (D-275 manufactured by Shin-etsu Silicone Co., Ltd.) in an amount of 5 parts per 100 parts of the hydroxyl group containing silicone resin with 20% (as nonvolatile content) of an addition polymerization type silicone resin B (a copolymer of 30% by mole of monophenylsiloxane unit, 5% by mole of diphenylsiloxane unit, 20% by mole of dimethylsiloxane unit, 10% by mole of methylvinylsiloxane unit, 25% by mole of methylhydrogensiloxane unit and 10% by mole of diphenylvinylsiloane unit together with 10 ppm of a platinum catalyst) and diluting the mixture with toluene so as to make the nonvolatile content 50%.

Using the thus prepared binder solution, uncalcined soft assembly mica sheet and glass cloth were bonded and the solvent was removed by evaporation. Thus, three kinds of glass-backed assembly mica tape (composite insulating materials) containing binder in an amount of 5, 20 and 35% as nonvolatile content based on the total weight of the composit insulating material were prepared. The resulting insulating materials were cut to give composite tapes of 25 mm wide.

An impregnating varnish of epoxy-isocyanate series resin was prepared by mixing 100 parts of diglycidyl ether of bisphenol A (DER-332 used in Example 1), 800 parts of liquid diphenylmethane diisocyanate (L-MDI) and 4.5 parts of 1-cyanoethyl-2-phenylimidazole (manufactured by Shikoku Kasei Co., Ltd.) (hereinafter referred to as "2PZ-CN"). Using the glass-backed mica tape and the inpregnating varnish thus prepared, electric windings were produced and tested in the same manner as described in Example 1.

The results of thermal resistance, short time thermal resistance and water resistance are as shown in Table 1.

EXAMPLES 17 AND 18

Using the same binder solution as used in Example 14 containing 80% of the hydroxyl group containing silicone resin and 20% of the addition polymerization type silicone resin, and as insulating materials polyimide film (Kapton, a trade mark, manufactured by E. I. du Pont de Nemours & Co.) and uncalcined soft mica sheet, a composite inuslating material was prepared by coating the binder solution on the insulating materials so as to make the binder content 20% (based on the total weight) and removing the solvent by evaporation. (Example 17)

On the other hand, using as insulating materials polyamide nonwoven fabric (Nomex 410 manufactured by E. I. du Pont de Nemours & Co.) and uncalcined soft mica sheet and the same binder solution as used in Example 14 mentioned above, a composite insulating material was prepared by coating the binder solution on the insulating materials so as to make the binder content 20% (based on the total weight) and removing the solvent by evaporation. (Example 18).

Using the thus prepared composite insulating tape and the same impregnating varnish of epoxy-isocyanate series varnish as used in Example 14, electric windings were produced and tested in the same manner as described in Example 1.

The results of thermal resistance, short time thermal resistance and water resistance are as shown in Table 1.

COMPARATIVE EXAMPLES 1–5

As the binder, condensation polymerization type silicone resins containing hydroxyl groups or addition polymerization type silicone resins were used alone. As the impregnating varnish, a mixture of 100 parts of DER-332, 400 parts of L-MDI and 2.5 parts of 2PZ-CN was used. Electric windings were produced according to Example 2 but the curing conditions of 160° C. for 2 hours and 200° C. for 15 hours were employed. Thermal resistance, short time thermal resistance and water resistance of the electric windings were tested in the same manner as described in Example 1. The results are as shown in Table 1.

As is clear from the results in Table 1, the electric windings produced by using the silicone binder according to this invention are superior to those produced by using a condensation polymerization type silicone resin containing hydroxyl groups or an addition polymerization type silicone resin alone as a binder for insulating materials.

TABLE 1

| Example No. | | | 1 | 2 | 3 |
|---|---|---|---|---|---|
| Silicone resin binder | Hydroxyl group containing silicone resin (%) | KR-272 | 95 | 95 | 95 |
| | | KR-275 | — | — | — |
| | | SH-994 | — | — | — |
| | Addition polymerization type silicone resin (%) | A | 5 | 5 | 5 |
| | | B | — | — | — |
| Coupling agent (A-1100) (g/m$^2$) | | | — | — | — |
| Composite insulating material | | | G-U | G-U | G-U |
| Binder content in the composite insulating material (%) | | | 5 | 20 | 35 |
| Impregnating varnish (parts) | Isocyanate | L-MDI | 400 (2.86 eq.) | 400 (2.86 eq.) | 400 (2.86 eq.) |
| | | | 100 | 100 | 100 |
| | Epoxy resin | DER-332 | (0.57 eq.) | (0.57 eq.) | (0.57 eq.) |
| | Curing catalyst | 2E4MZ | 3.0 | 3.0 | 3.0 |
| | | 2PZ-CN | — | — | — |

| 4 | 5 | 6 | 7 | 8 | 9 | 10* |
|---|---|---|---|---|---|---|
| 90 | 80 | 50 | — | — | — | — |
| — | — | — | 80 | 80 | 80 | 80 |
| — | — | — | — | — | — | — |
| 10 | 20 | 50 | 20 | 20 | 20 | 20 |
| — | — | — | — | — | — | — |
| — | — | — | — | — | — | — |
| G-U | G-U | G-U | G-U | G-U | G-U | G-U |
| 20 | 20 | 20 | 5 | 20 | 35 | 20 |
| 400 | 400 | 400 | 400 | 400 | 400 | 400 |
| (2.86 eq.) | (2.86 eq.) | (2.86 eq.) | (2.86 eq.) | (2.86 eq.) | (2.86 eq.) | (2.86 eq.) |
| 100 | 100 | 100 | 100 | 100 | 100 | 100 |
| (0.57 eq.) | (0.57 eq.) | (0.57 eq.) | (0.57 eq.) | (0.57 eq.) | (0.57 eq.) | (0.57 eq.) |
| 3.0 | 3.0 | 3.0 | 3.0 | 3.0 | 3.0 | 3.0 |
| — | — | — | — | — | — | — |

| 11 | 12 | 13 | 14 | 15 | 16 | 17 |
|---|---|---|---|---|---|---|
| 80 | — | — | 80 | 80 | 80 | 80 |
| — | 90 | 80 | — | — | — | — |
| 20 | 10 | 20 | — | — | — | — |
| — | — | — | 20 | 20 | 20 | 20 |
| 0.5 | — | — | — | — | — | — |
| G-U | G-U | G-U | G-U | G-U | G-U | K-U |
| 20 | 20 | 20 | 5 | 20 | 35 | 20 |

TABLE 1-continued

| | | | | | | |
|---|---|---|---|---|---|---|
| 400 | 400 | 400 | 800 | 800 | 800 | 800 |
| (2.86 eq.) | (2.86 eq.) | (2.86 eq.) | (5.72 eq.) | (5.72 eq.) | (5.72 eq.) | (5.72 eq.) |
| 100 | 100 | 100 | 100 | 100 | 100 | 100 |
| (0.57 eq.) | (0.57 eq.) | (0.57 eq.) | (0.57 eq.) | (0.57 eq.) | (0.57 eq.) | (0.57 eq.) |
| 3.0 | 3.0 | 3.0 | — | — | — | — |
| — | — | — | 4.5 | 4.5 | 4.5 | 4.5 |

| | 18 | Comparative Example 1 | Comparative Example 2 | Comparative Example 3 | Comparative Example 4 | Comparative Example 5 |
|---|---|---|---|---|---|---|
| | — | 100 | — | — | — | — |
| | 80 | — | 100 | — | — | — |
| | — | — | — | 100 | — | — |
| | — | — | — | — | 100 | — |
| | 20 | — | — | — | — | 100 |
| | — | — | — | — | — | — |
| | N-U | G-U | G-U | G-U | G-U | G-U |
| | 20 | 20 | 20 | 20 | 20 | 20 |
| | 800 | 400 | 400 | 400 | 400 | 400 |
| | (5.72 eq.) | (2.86 eq.) | (2.86 eq.) | (2.86 eq.) | (2.86 eq.) | (2.86 eq.) |
| | 100 | 100 | 100 | 100 | 100 | 100 |
| | (0.57 eq.) | (0.57 eq.) | (0.57 eq.) | (0.57 eq.) | (0.57 eq.) | (0.57 eq.) |
| | — | — | — | — | — | — |
| | 4.5 | 2.5 | 2.5 | 2.5 | 2.5 | 2.5 |

| | | Example No. | 1 | 2 | 3 |
|---|---|---|---|---|---|
| Properties | Thermal resistance | Initial time tan δ (%) | 1.8 | 1.5 | 1.3 |
| | | Meg. (MΩ) | ∞ | ∞ | ∞ |
| | | After 5 cycles tan δ (%) | 11.3 | 12.2 | 13.5 |
| | | Meg. (MΩ) | ∞ | ∞ | ∞ |
| | | After 10 cycles tan δ (%) | 15.9 | 11.1 | 13.3 |
| | | Meg. (MΩ) | 800 | ∞ | ∞ |
| | | Weight loss (%), 270° C./10 days | 7.1 | 7.6 | 7.9 |
| | Water resistance | Retention of flexural strength after immersed in water at 40° C. for 24 hours (%) | 45 | 49 | 58 |

| 4 | 5 | 6 | 7 | 8 | 9 | 10* |
|---|---|---|---|---|---|---|
| 1.4 | 1.3 | 1.6 | 1.4 | 1.4 | 1.4 | 1.3 |
| ∞ | ∞ | ∞ | ∞ | ∞ | ∞ | ∞ |
| 13.8 | 12.1 | 15.5 | 12.2 | 12.2 | 13.5 | 11.1 |
| ∞ | ∞ | ∞ | ∞ | ∞ | ∞ | ∞ |
| 10.1 | 9.9 | 9.6 | 11.5 | 10.1 | 10.8 | 10.8 |
| ∞ | ∞ | ∞ | 1000 | ∞ | ∞ | ∞ |
| 7.5 | 8.8 | 10.3 | 7.3 | 7.5 | 8.1 | 7.7 |
| 80 | 87 | 97 | 60 | 87 | 80 | 86 |

| 11 | 12 | 13 | 14 | 15 | 16 | 17 |
|---|---|---|---|---|---|---|
| 1.2 | 1.2 | 1.2 | 1.5 | 1.4 | 1.5 | 1.1 |
| ∞ | ∞ | ∞ | ∞ | ∞ | ∞ | ∞ |
| 10.5 | 11.4 | 11.6 | 12.2 | 12.8 | 13.3 | 10.5 |
| ∞ | ∞ | ∞ | ∞ | ∞ | ∞ | ∞ |
| 12.5 | 11.6 | 10.6 | 16.2 | 12.2 | 12.9 | 9.6 |
| ∞ | ∞ | ∞ | 1000 | ∞ | ∞ | ∞ |
| 8.4 | 7.2 | 7.8 | 6.8 | 7.2 | 7.5 | 6.2 |
| 92 | 82 | 96 | 61 | 86 | 86 | 85 |

| 18 | Comparative Example 1 | Comparative Example 2 | Comparative Example 3 | Comparative Example 4 | Comparative Example 5 |
|---|---|---|---|---|---|
| 1.4 | 1.7 | 1.6 | 1.2 | 2.1 | 2.2 |
| ∞ | ∞ | ∞ | ∞ | ∞ | ∞ |
| 12.8 | 18.6 | 17.3 | 16.5 | 19.9 | 20.1 |
| 100 | 100 | 100 | 100 | 80 | 50 |
| 10.5 | 22.7 | 21.5 | 20.2 | 22.5 | 24.5 |
| 500 | 80 | 80 | 80 | 5 | 5 |
| 10.3 | 7.3 | 6.5 | 7.8 | 19.6 | 20.5 |
| 96 | 33 | 35 | 37 | 90 | 94 |

Note
G-U: Glass cloth and uncalcined soft assembly mica
2E4MZ: 2-Ethyl-4-methylimidazole
2PZ-CN: 1-Cyanoethyl-2-phenylimidazole
*: In Example 10, a catalyst for the impregnating varnish is previously mixed with the silicone resin binder.
A-1100: γ-Aminopropyltriethoxysilane
K-U: Polyimide film and uncalcined soft assembly mica
N-U: Polyamide unwoven fabric and uncalcined soft assembly mica

EXAMPLE 19

A binder solution was prepared by mixing 80% (as nonvolatile content) of a condensation polymerization type silicone resin containing hydroxyl groups (a 50% solution of KR-275) and 20% (as nonvolatile content) of an addition polymerization type silicone resin A (the same composition as used in Example 1 but containing 0.5% of dicumyl perioxide as catalyst) and diluting the mixture with toluene so as to make the nonvolatile content 50%.

Using the thus prepared binder solution, assembly mica sheet and glass cloth were bonded and the solvent was removed by evaporation to prepare a composite insulating material having a thickness of about 0.2 mm. The resulting composite material was cut to give composite tape of 25 mm wide and containing 25% of the binder.

The composite tape was wrapped around a coil conductor so as to give eight layers by half wrap and subsequently impregnated under reduced pressure with an impregnating varnish prepared by mixing 100 parts of an epoxy compound (DER-332), 800 parts of an isocyanate compound (L-MDI) and 4.5 parts of 2PZ-CN as catalyst. The impregnated tape was cured at 100°–150° C. for 15 hours and at 200°–230° C. for 5 hours to give an electric winding.

Thermal resistance, short time thermal resistance and water resistance of the electric winding were tested in the same manner as described in Example 1 to give the same results as obtained in Example 16.

What is claimed is:

1. A winding for electric rotating machines having a plurality of layers of a sheet-form composite insulating material wrapped around a conductor and a cured resin impregnated into said layers, said cured resin being of an epoxy-isocyanate varnish, said sheet-form composite insulating material comprising two or more sheet-form insulating materials bonded by a binder, characterized in that said binder is a mixture of a condensation polymerization type silicone resin containing hydroxyl groups in the molecule and an addition polymerization type silicone resin.

2. An electric winding according to claim 1, wherein the binder comprises 50 to 95% by weight of the condensation polymerization type silicone resin containing hydroxyl groups in the molecule and 50 to 5% by weight of the addition polymerization type silicone resin.

3. An electric winding according to claim 1, wherein the hydroxyl group content in the condensation polymerization type silicone resin is 0.2 to 1% by weight.

4. An electric winding according to claim 1 or 2, wherein the binder content is 5 to 35% by weight based on the total weight of the composite insulating material and the binder.

5. An electric winding according to claim 2, wherein the binder further contains a silane coupling agent.

6. An electric winding according to claim 1, wherein the epoxy-isocyanate resin comprises 1.5 equivalents or more of polyfunctional isocyanate compound per equivalent of polyfunctional epoxy compound.

7. An electric winding according to claim 1, wherein the composite insulating material is composed of at least one member selected from the group consisting of glass sheet, polyimide film and an aromatic polyamide sheet and assembly mica sheet.

8. A process for producing an electric winding comprising wrapping around a conductor a plurality of layers of a sheet-form composite insulating material comprising two or more sheet-form insulating materials bonded by a binder, impregnating the layers with an impregnating varnish of an epoxy-isocyanate resin and curing the resulting impregnated varnish, the improvement wherein said binder is a mixture of a condensation polymerization type silicone resin containing hydroxyl groups in the molecule and an addition polymerization type silicone resin.

9. A process according to claim 8, wherein the binder comprises 50 to 95% by weight of the condensation polymerization type silicone resin containing hydroxyl groups in the molecule and 50 to 5% by weight of the addition polymerization type silicone resin.

10. A process according to claim 8, wherein the hydroxyl group content in the condensation polymerization type silicone resin is 0.2 to 1% by weight.

11. A process according to claim 8, wherein the binder content is 5 to 35% by weight based on the total weight of the composite insulating material and the binder.

12. A process according to claim 8, wherein the binder solution contains an effective amount of a curing catalyst for the epoxy-isocyanate resin.

13. A process according to claim 8 or 12, wherein the binder solution contains an effective amount of a silane coupling agent.

14. A process according to claim 8, wherein the composite insulating material is composed of at least one member selected from the group consisting of glass sheet, polyimide film, aromatic polyamide sheet and assembly mica sheet.

15. A process for producing an electric winding which comprises bonding assembly mica sheet with at least one insulating sheet having thermal resistance of class H by using an organic solvent solution of a binder comprising 20% by weight of an addition polymerization type silicon resin containing a peroxide in an amount of 0.1 to 1 part by weight based on 100 parts by weight of the addition polymerization type silicone resin and 80% by weight of a condensation polymerization type silicone resin containing hydroxyl groups in the molecule wherein the hydroxyl group content is 0.2 to 1% by weight to form a composite insulating tape having the binder content of 5 to 35% by weight based on the total weight of the tape including the binder after removing the solvent by evaporation, wrapping the composite insulating tape around an electric conductor, impregnating the wrapped composited insulating tape with an impregnating varnish of an epoxy-isocyanate resin containing 2.5 to 25 equivalents of isocyanate compound per equivalent of epoxy compound and a curing catalyst for forming isocyanaurate and oxazolidone rings in an amount of 1 to 5 parts by weight based on 100 parts by weight of the epoxy-isocyanate resin, and curing the resulting impregnated composite insulating tape with heating.

16. A process according to claim 15, wherein the insulating sheet having thermal resistance of class H is glass fibers, polyimide or aromatic polyamide fibers.

17. A process according to claim 15, wherein the epoxy-isocyanate resin contains 5 to 10 equivalents of the isocyanate compound per equivalent of the epoxy compound and the curing catalyst is an imidazole compound.

* * * * *